(No Model.)
E. H. AMET.
SIGNALING ATTACHMENT FOR WEIGHING SCALES.
No. 391,831. Patented Oct. 30, 1888.
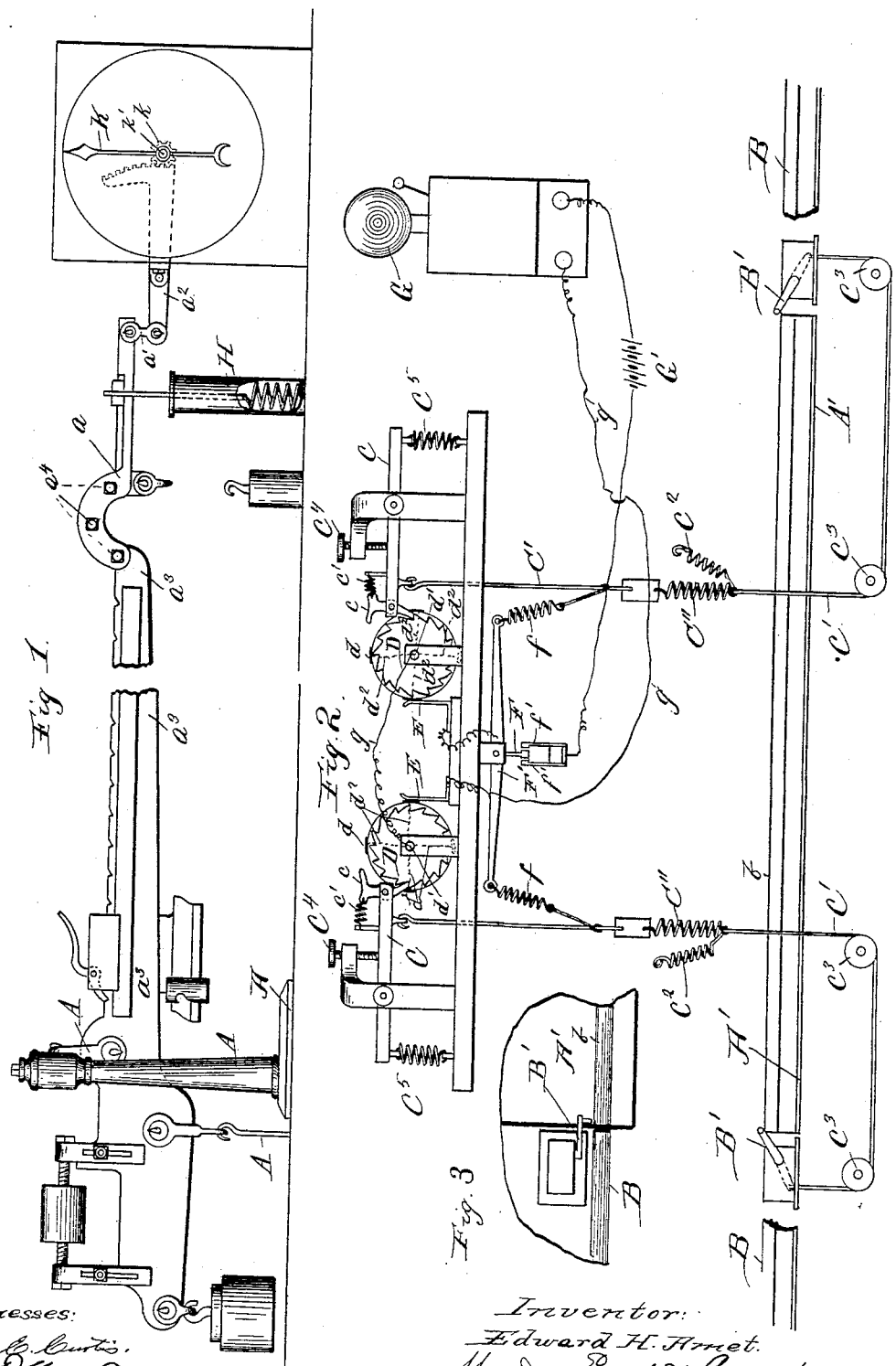
Witnesses:
Inventor:
Edward H. Amet.
By Munday, Evarts & Adcock,
His Atty's.

UNITED STATES PATENT OFFICE.

EDWARD H. AMET, OF CHICAGO, ILLINOIS, ASSIGNOR TO HIMSELF AND HERBERT A. STREETER, OF SAME PLACE.

SIGNALING ATTACHMENT FOR WEIGHING-SCALES.

SPECIFICATION forming part of Letters Patent No. 391,831, dated October 30, 1888.

Application filed March 2, 1888. Serial No. 265,966. (No model.)

*To all whom it may concern:*

Be it known that I, EDWARD H. AMET, a citizen of the United States, residing in Chicago, in the county of Cook and State of Illinois, have invented a new and useful Improvement in Signaling Attachments for Weighing-Scales, of which the following is a specification.

My invention relates to scales for weighing vehicles, and more especially to scales for weighing railway-cars.

In railway-scales it is customary to inclose the scale beam and scale mechanism in a small building or housing, both for the protection of the mechanism from the weather and for the convenience and comfort of the weigh-master. This small shed or building is usually provided with one or more windows, through which the weigh-master may look to see when all four wheels of the car are properly on the scale-platform. This is a matter of some inconvenience and requires some considerable time.

The object of my invention is to provide an automatic device for indicating when the car or other vehicle is properly on the scale-platform in readiness to be weighed.

My invention consists in the combination of the scale and the scale-platform with a bell or other sound-indicator and mechanism for automatically operating the bell or indicator the moment all the wheels of the car pass onto the scale-platform. The bell or indicator I prefer to use is an electrically-operated one, though it may be operated mechanically. A lever located near the track-rail is operated or depressed by each car-wheel. This lever is connected by a cord with a pawl-lever which operates to turn a ratchet-wheel one tooth for each car-wheel. When the ratchet-wheel has been turned four teeth by the passage of all four car-wheels of the car, the bell is operated, this being preferably done by closing an electric circuit.

In the accompanying drawings, which form a part of this specification, and in which similar letters of reference indicate like parts, Figure 1 is a side elevation of the scale-beam, and Fig. 2 is a side elevation or diagram view showing the scale-platform and the mechanism for operating the bell when the four wheels of the car pass onto the scale-platform. Fig. 3 is a plan view showing one of the car-wheel-operated levers and its relation to the track-rail.

In said drawings, A represents a scale or a portion thereof; A', the platform; B, the railway track-rails, and $b$ the track-rails on the scale-platform.

B' B' are the operating-levers, one at each end of the scale-platform, projecting at the side of the track-rail $b$, so that each wheel of the car as it passes the levers B' B' will depress the same. There are two of these operating-levers, so that the mechanism may be operated from whichever direction the car approaches the scale-platform.

C C are a pair of pawl-levers furnished with pawls $c$ $c$, which operate the ratchet-wheels D D. The pawl-levers C C are connected with the wheel-operated levers B' B' by cords or lines C' C'. These lines are furnished with springs $C^2$ $C^2$, which serve to keep the levers B' B' in position. The lines C' C' pass over or around pulleys $C^3$ $C^3$. The pawl-levers C C are held in position against set-screws $C^4$ by springs $C^5$, which are made stronger than the springs $C^2$. The cords C' each have thereon a coil or other spring, C'', as indicated in the drawings, to give them the requisite elasticity to prevent undue strain being exerted upon the mechanism by the car-wheel-operated levers B'. If the lines C are of wire, these springs are very necessary; but if the lines C are somewhat elastic the springs may be omitted. The pawls $c$ are furnished with springs $c'$. The ratchet-wheels D are each furnished with four contact-points, $d$, which are electrically connected with the shaft $d'$ of the ratchet-wheel by the wires or connections $d^2$.

E E are stationary contact-pieces, with which the contacts $d$ on the ratchet-wheels make connection each time the ratchet-wheels are turned one-quarter around or the distance of four of the ratchet-teeth.

F is a movable contact-piece operated by a lever, F', the arms of which are connected by springs $f$ with the cords C', so that at each movement of the cords C' by the levers B' the contact-piece F will make connection with the contact-piece $f'$. The contact-piece $f'$ is a double contact, between the two parts of which the contact F oscillates on the pivot of its lever, making connection by striking against one part or the other of the double contact, according as the contact F is oscillated by the one or the other of the levers B' B' and connecting-cords C' C'.

G represents an ordinary electric bell; G', the battery, and $g$ the circuit leading from the battery and bell through the contact-pieces E $d$ F $f'$ when the circuit is closed at both points.

The scale beam is furnished with a removable exterior piece, $a$, at its outer end, which is connected with a variable counterpoise, H, consisting, preferably, of a coiled spring inclosed in a suitable case. The extension-piece $a$ is also connected, by a link, $a'$, with a segment-gear lever, $a^2$, which operates the gear $k$ on the shaft $k'$ of the pointer K, so that when desired for quick weighing the pointer may be made to indicate the weight. The extension-piece $a$ is connected to the end of the scale-beam $a^3$ by bolts $a^4$, so that it may be readily removed and the scale-beam used in the ordinary way by means of its movable counterpoise.

In operation, when the first three wheels of the car pass onto the scale-platform, the lever B' will be operated by each wheel in succession, which will move the ratchet-wheel D the distance of three teeth, so that the circuit will still remain open at the contact-piece E. When the fourth wheel passes onto the platform, one of the contact-pieces $d$ will close the circuit at E, and at the same time the circuit will be closed at $f'$ by the movable contact F, so that the bell will be rung the moment the fourth wheel of the car passes entirely onto the scale-platform. As the car passes off of the scale-platform, it will operate the other lever B' at the opposite end and again ring the bell when the fourth and last wheel passes entirely off of the platform. It will thus be seen that both the ratchet-wheels are always automatically set or left in proper position for operation, from whichever direction the next car may approach, by the mere passage of the wheels of the car onto and off of the scale-platform. By this means the weigh-master may weigh much more conveniently and quickly, as the ringing of the bell indicates the very instant when the four wheels of the car pass onto the scale-platform, and he is saved the trouble of looking first to one end of the car and then to the other to see if all the wheels of the car are properly on the scale-platform.

In case the vehicles generally to be weighed were provided with a different number of wheels than four on a side, of course it should be understood that the ratchet-wheels should be provided with a correspondingly-different number of teeth between the contact-points $d$.

I claim—

1. The combination, with a scale having a scale-platform provided with track-rails, of an operating-lever projecting in the path of the wheels passing over said track-rails, an indicator-bell, and connecting mechanism for operating said bell by said lever, substantially as specified.

2. The combination, with a scale having a scale-platform provided with track-rails thereon, an operating-lever projecting in the path of the wheels passing over said track-rails, a pawl-lever and ratchet-wheel having four teeth or a multiple thereof, a bell, and mechanism connecting the ratchet-wheel with the bell, so that the bell will be rung at each fourth movement of the ratchet-wheel, substantially as specified.

3. The combination, with a scale having a scale-platform provided with track-rails thereon, a pair of vehicle-wheel-operated levers, one located at each end of the platform, a bell, and mechanism connecting the bell with said wheel-operated levers, substantially as specified.

4. The combination, with a scale having a scale-platform provided with track-rails thereon, a pair of wheel-operated levers, an electric bell and electric circuit, a pair of pawl-levers connected with and operated by said wheel-operated levers, a pair of ratchet-wheels having contact-points at intervals, and a pair of stationary contacts, substantially as specified.

5. The combination, with a scale having a scale-platform provided with track-rails thereon, a pair of wheel-operated levers, an electric bell and electric circuit, a pair of pawl-levers connected with and operated by said wheel-operated levers, a pair of ratchet-wheels having contact-points at intervals, and a pair of stationary contacts, a movable contact, F, lever F', and stationary contact $f'$, substantially as specified.

6. The combination, with a scale having a scale-platform provided with track-rails, of an operating-lever projecting in the path of the wheels passing over said track-rails, an indicator-bell and connecting mechanism for operating said bell by said lever, the scale-beam and a variable counterpoise, H, connected therewith, a segment-gear lever connected with the scale-beam, and a pointer operated by said segment-gear, substantially as specified.

EDWARD H. AMET.

Witnesses:
H. M. MUNDAY,
EDMUND ADCOCK.